(12) United States Patent
Xue et al.

(10) Patent No.: US 10,948,207 B2
(45) Date of Patent: Mar. 16, 2021

(54) AIR PURIFIER AND AIR PURIFICATION METHOD

(71) Applicant: KONINKLIJKE PHILIPS N.V., Eindhoven (NL)

(72) Inventors: Ruifeng Xue, Eindhoven (NL); Rui Ke, Eindhoven (NL); Shan Zhu, Eindhoven (NL); Shuang Chen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 273 days.

(21) Appl. No.: 16/085,005

(22) PCT Filed: Mar. 15, 2017

(86) PCT No.: PCT/EP2017/056070
§ 371 (c)(1),
(2) Date: Sep. 14, 2018

(87) PCT Pub. No.: WO2017/157987
PCT Pub. Date: Sep. 21, 2017

(65) Prior Publication Data
US 2019/0078802 A1    Mar. 14, 2019

(30) Foreign Application Priority Data

Mar. 16, 2016   (WO) ................ PCT/CN2016/076523
Jun. 28, 2016   (EP) ..................................... 16176725

(51) Int. Cl.
*F24F 11/32*      (2018.01)
*F24F 3/16*       (2021.01)
(Continued)

(52) U.S. Cl.
CPC ............ *F24F 11/32* (2018.01); *F24F 3/1603* (2013.01); *F24F 11/30* (2018.01); *G01N 27/409* (2013.01);
(Continued)

(58) Field of Classification Search
CPC .......... F24F 11/32; F24F 11/30; F24F 3/1603; F24F 2110/50; F24F 2110/64;
(Continued)

(56) References Cited

U.S. PATENT DOCUMENTS

| 4,116,797 A | 9/1978 | Akatsuka |
| 5,173,166 A | 12/1992 | Tomantschger et al. |
| 2014/0174154 A1* | 6/2014 | Marra ................ G01N 3/4045 73/31.01 |

FOREIGN PATENT DOCUMENTS

| EP | 2072920 A1 | 6/2009 |
| JP | 2001305092 A | 10/2001 |

(Continued)

OTHER PUBLICATIONS

M. Mori, H. Nishimura, Y. Itagaki, and Y. Sadaoka, "Potentiometric VOC detection in air using 8YSZ-based oxygen sensor modified with SmFeO3 catalytic layer," Sensors and Actuators B: Chemical, 142 (2009) 141-146.

(Continued)

*Primary Examiner* — Toan M Le (57) ABSTRACT

An air purifier comprise a gas filter between an upstream air flow and a downstream air flow and a concentration sensor comprising a first electrode and a second electrode, the first electrode being exposed to the upstream air flow and the second electrode exposed to the downstream air flow, the concentration sensor providing an output signal based on the difference in concentrations of a target gas at the first and second electrodes. The output signal is processed to determine information relating to the condition of the gas filter.

20 Claims, 4 Drawing Sheets

(51) Int. Cl.
    *G01N 27/409*      (2006.01)
    *F24F 11/30*       (2018.01)
    *G01N 27/66*       (2006.01)
    *F24F 110/50*      (2018.01)
    *F24F 110/64*      (2018.01)

(52) U.S. Cl.
    CPC ...... *G01N 27/66* (2013.01); *F24F 2003/1614* (2013.01); *F24F 2110/50* (2018.01); *F24F 2110/64* (2018.01); *Y02A 50/20* (2018.01)

(58) Field of Classification Search
    CPC ............ F24F 2003/1614; G01N 27/66; G01N 27/409; Y02A 50/21
    See application file for complete search history.

(56) References Cited

FOREIGN PATENT DOCUMENTS

| | | |
|---|---|---|
| JP | 2009215933 A | 9/2009 |
| JP | 2012233444 A | 11/2012 |
| WO | 2012069963 A1 | 5/2012 |
| WO | 2016030386 A1 | 3/2016 |

OTHER PUBLICATIONS

M. Mori, Y. Itagaki, and Y. Sadaoka, "VOC detection by potentiometric oxygen sensor based on YSZ and modified Pt electrode," Sensors and Actuators B: Chemical, 161 (2012) 471-479.

\* cited by examiner

AIR PURIFIER AND AIR PURIFICATION METHOD

This application is the U.S. National Phase application under 35 U.S.C. § 371 of International Application No. PCT/EP2017/056070, filed on Mar. 15, 2017, which claims the benefit of International Application No. 16176725.6 filed on Jun. 28, 2016 and International Application No. PCT/CN2016/076523 filed on Mar. 16, 2016. These applications are hereby incorporated by reference herein.

FIELD OF THE INVENTION

This invention relates to air purifiers, and in particular relates to indication of the filter lifetime in such air purifiers.

BACKGROUND OF THE INVENTION

Particle filters and gas filters are usually incorporated into an air purifier for filtering out airborne pollutants.

The lifetime of particle filters can be derived by checking the pressure drop caused. The pressure drop across the particle filter can be easily monitored in-situ and in real time using a differential pressure gauge. If the pressure drop increases beyond a pre-set threshold, the filter has been overloaded with particles surpassing its capacity, which means the filter has reached the end of its useful lifetime. This way of detecting the particle filter lifetime is in consistent with professional detection methods in laboratory and industry.

However, for detection of a gas filter lifetime, there is no such simple and reliable solution, which can satisfy the requirement of continuous in-situ monitoring at a low cost.

The gas filter has to be sent to a laboratory to follow the tedious procedures of a CADR (clear air delivery rate) degradation check. Alternatively, expensive professional instruments have to be leveraged twice to measure the gaseous pollutant level before and after the gas filter respectively. Employment of two independent sensors at both sides of the filter to check the pollutant concentration difference may not be reliable due to large sensor-to-sensor variation.

In-situ filter lifetime indication in known home air purifiers is based on airflow accumulation in different operating modes. In this way, a total volume of air flow through the filter is set for different operating modes, and this air flow volume is monitored and compared to a preset threshold. There is thus no feedback concerning the actual state of the filter.

This is an inaccurate estimation method and it does not reflect real filter conditions. It may either be risky to expose consumers to air pollution by running an ineffective filter, or not ecologically friendly due to replacement of an unexhausted filter.

It would therefore be desirable to provide a low-cost and in-situ solution for consumer applications which is able to reliably detect the filter condition and truly reflect the real lifetime.

Reliable methods to detect the filter lifetime for particle filters exist but unfortunately currently there are no suitable methods for gas filters.

SUMMARY OF THE INVENTION

The invention is defined by the claims.

According to an aspect of the invention, there is provided an air purifier, comprising:

a gas filter located between an upstream air flow and a downstream air flow;

a concentration sensor comprising a first electrode and a second electrode, the first electrode being exposed to the upstream air flow and the second electrode exposed to the downstream air flow, the concentration sensor providing an output signal based on the difference in concentrations of a target gas at the first and second electrodes; and a processor configured for processing the output signal to determine information relating to the condition of the gas filter.

For example, the upstream air flow may be the air flow directed towards the gas filter for filtering. The downstream air flow may be the air flow filtered by the gas filter and directed away from the gas filter. Thus, in this example the gas filter is located in between the upstream and the downstream air flow inside the air purifier. For example, the gas filter is located in an air duct of the air purifier.

In this arrangement, a concentration sensor is used to determine information about the performance of a gas filter. This provides an accurate way of determining information such as a real-time filter lifetime indication, and it can be implemented based on a low cost and in-situ method. The concentration sensor measures a pollutant concentration difference between the two sides of the gas filter but using a single sensor structure. This avoids the need for multiple sensors with different characteristics or for measurements to be made during different multiple modes of operation. The reliability of the system is not influenced by ambient conditions either.

Note that the concentration difference may be measured as a concentration of the target at one electrode relative to the concentration at the other electrode, and hence a relative concentration measurement rather than a direct measure of a difference in concentration levels.

The gas filter lifetime is detected using a sensor which measures the concentration difference of gaseous pollutants before and after passing through the gas filter. This for example accurately indicates the one-pass efficiency and hence the lifetime of a gas filter with a low cost sensor arrangement. The invention can be applied to existing air purifiers and can provide a real-time alert of filter failure without manual intervention and thereby guarantee clean air for consumers.

In one implementation, the air purifier may further comprise an additional sensor exposed to the upstream air flow.

This may be used to perform a calibration, so that an absolute level of pollutant concentration may be taken into account instead of only a difference in concentrations between the upstream and downstream sides of the gas filter. While this results in the use of two sensors, the reliability of the measurements is improved by using a main sensor which has a single sensor structure for measuring the concentration difference.

In another implementation, the air purifier may further comprise a reference electrode exposed to a confined gas volume which functions as a reference or calibration gas. The reference electrode is on the downstream side of the concentration sensor, so that the upstream electrode and the reference electrode enable a concentration difference to be determined between the upstream air flow and the reference or calibration gas.

This reference electrode avoids the need for a separate calibration sensor. Instead, a single sensor structure has a three-electrode configuration. In this way, there are two concentration differences measured (i.e. two relative concentrations), and this again enables an absolute concentration level to be taken into account when interpreting the sensor readings. Thus, the reference electrode functions as an alternative implementation of a calibration module.

The calibration module may instead be implemented as a user interface allowing the user to input information, or as a communications module for receiving information from an external data source.

The information relating to the condition of the gas filter may comprise advice that the gas filter has reached its end of life or the remaining usage time of the gas filter.

The processor may be adapted to determine that the gas filter has reached its end of life if an output signal, relating to the concentration change across the gas filter, is below a threshold.

The information may comprise the one-pass efficiency of the gas filter and/or the clean air delivery rate of the air purifier.

The concentration sensor comprises an electrolyte, e.g. a solid electrolyte, concentration sensor, having an electrolyte, e.g. a solid electrolyte, located between the first and second electrodes.

The solid electrolyte may comprise zirconia, and the electrodes may be platinum optionally with a gold coating.

This is one example of suitable sensor configuration. Sensors for various gaseous species can be designed by employing appropriate materials as the electrolyte and the electrodes. Many materials with ionic or mixed ionic electronic conductivity are known in electrochemical devices, such as solid oxide fuel cells (SOFCs), sensors, oxygen generators, electrochemical converters of natural gas and electrolyzers. These various technologies could potentially be used to form the concentration sensor.

The gas filter may comprise activated carbon or other sorption materials. These are used to remove target gaseous pollutants such as toluene, and formaldehyde. Activated carbon filters and corrugated formaldehyde filters are well known.

The upstream air flow is for example coupled to a first side channel which communicates with the first electrode, and the downstream air flow is coupled to a second side channel which communicates with the second electrode.

Examples in accordance with another aspect of the invention provide an air purification method, comprising:

performing gas filtering between an upstream air flow and a downstream air flow;

sensing a concentration difference of a target between the upstream side and the downstream side using a concentration sensor comprising a first electrode and a second electrode, the first electrode being exposed to the upstream air flow and the second electrode exposed to the downstream air flow, and wherein the concentration sensor comprises an electrolyte located between the first and second electrodes; and processing the concentration difference to determine information relating to the condition of the gas filter.

The information may comprise advice that the gas filter has reached its end of life or the remaining usage time of the gas filter. The method may comprise determining that the gas filter has reached its end of life if an output signal, relating to the concentration change across the gas filter, is below a threshold.

The information may comprise the one-pass efficiency of the gas filter and/or the clean air delivery rate of the air purifier.

The method may further comprise performing a calibration using an additional sensor exposed to the upstream air flow or using a reference electrode of the concentration sensor exposed to a confined gas volume.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an air purifier comprising a gas filter between an upstream air flow and a downstream air flow and a concentration sensor comprising a first electrode and a second electrode, the first electrode being exposed to the upstream air flow and the second electrode exposed to the downstream air flow, the concentration sensor providing an output signal based on the difference in concentrations of a target gas at the first and second electrodes. The output signal is processed to determine information relating to the condition of the gas filter.

The invention for example makes use of a sensor of a type which is known for use in a concentration cell, for example of the type used as an oxygen sensor for controlling the air-to-fuel ratio in automobiles.

Figure 1:
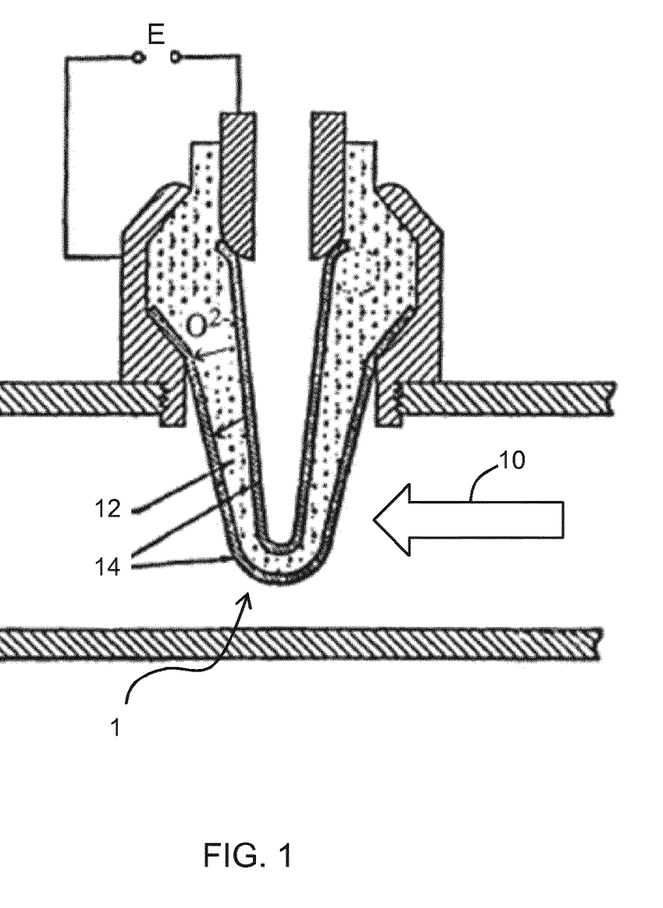
FIG. 1 shows a known concentration sensor.

An example of this type of sensor is shown in FIG. 1. The sensor comprises a probe 1 which extends into an exhaust gas flow 10. The probe comprises a stabilized zirconia ($ZrO_2$) electrolyte 12 surrounded by Pt catalyst electrodes 14. One electrode is exposed to the exhaust gas and the other is exposed to the ambient air, and the output E of the sensor is the voltage between the electrodes.

When two compartments with different oxygen concentrations are separated by a solid electrolyte, namely the stabilized zirconia in this example, which is an $O^{2-}$ ionic conductor, an oxygen gas concentration cell is formed. There is a driving force to move oxygen anions through the electrolyte, from the compartment with a higher oxygen concentration to the lower one. The Pt electrode potential E can be estimated by the Nernst equation:

$$E = \frac{RT}{4F} \ln\left(\frac{P_{high}(O_2)}{P_{low}(O_2)}\right)$$

where R is the gas constant, T is the absolute temperature, F is Faraday's constant and $P_{high}(O_2)$ and $P_{low}(O_2)$ are the oxygen potential pressures on the high and low sides, respectively.

By modifying the Pt electrodes with other materials or depositing an oxide semiconductor layer between the sensing electrode and zirconia, the sensor is also made sensitive to various reducing and oxidizing gases other than oxygen. The response E to such a non-oxygen gas increases or decreases linearly with the increasing logarithm of the partial pressure of the gas, while the value of E to a fixed ambient gas varies in dependence on the kind and size of the oxides used.

The sensor can be designed to detect sub-ppm levels of VOCs, such as ethanol, acetic acid, methylethylketone, benzene, toluene and xylene.

In the air purifier of the invention, this general type of concentration cell sensor is used to detect a pollutant concentration difference of air before and after passing through a gas filter, and this is then used to estimate the filter lifetime. This provides a reliable and low-cost solution to in-situ detection of the gas filter lifetime.

Figure 2:
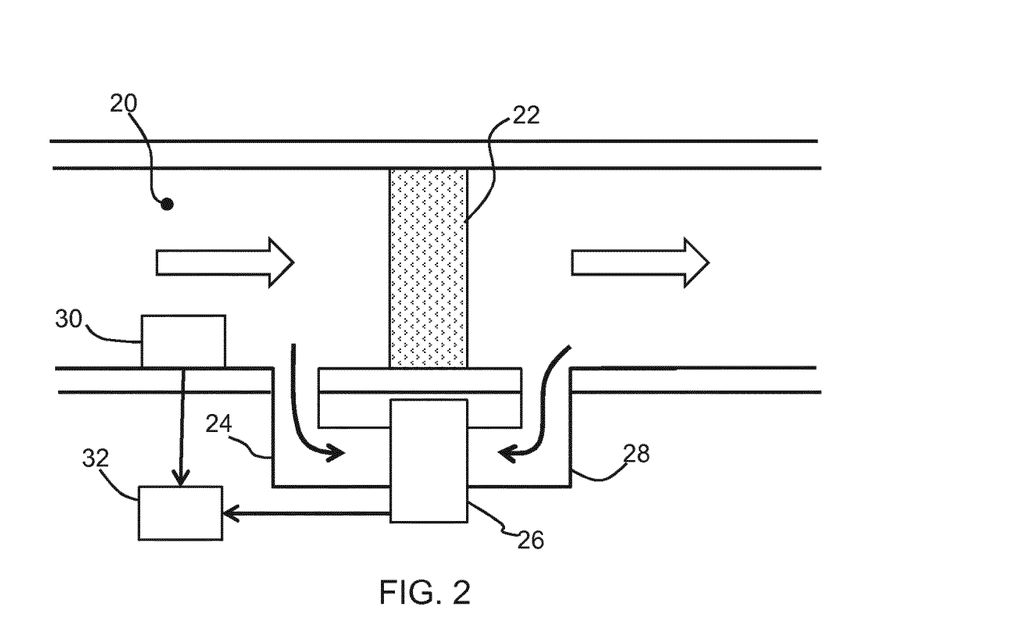
FIG. 2 shows an air purifier in schematic form.

FIG. 2 shows the general configuration of the air filter.

There is a main air flow channel 20 which includes a gas filter 22. A feed branch 24 forms a first side channel from the inlet side of the main flow channel, and it leads to the one side of the concentration sensor 26. A return branch 28 forms a second side channel from the outlet side of the main flow channel and it leads to the other side of the concentration sensor 26. The feed and return branches channel the air before and after passing through the gas filter 22 to the two sides of the electrolyte of the concentration cell sensor 26. Hence, the concentration cell 26 is exposed to filtered air on one side and unfiltered air on another side. The different sides comprise:

An upstream sensor 30 is also shown which functions as a calibration module configured for providing an initial pollutant concentration value, for use in calibration the difference information obtained by the sensor 26. As explained below, this may be used in some examples but is not needed in other examples, where other implementations of calibration module are possible.

The concentration cell sensor 26 converts the concentration difference of gaseous pollutants at the two sides of its electrolyte to an electrode potential (E).

A control unit 32 processes the sensor signals. For example, it may be used to compare the sensed signals with a threshold or set of thresholds to judge whether the gas filter 22 is effective or not, and further to evaluate the lifetime of the gas filer 22.

Figure 3:
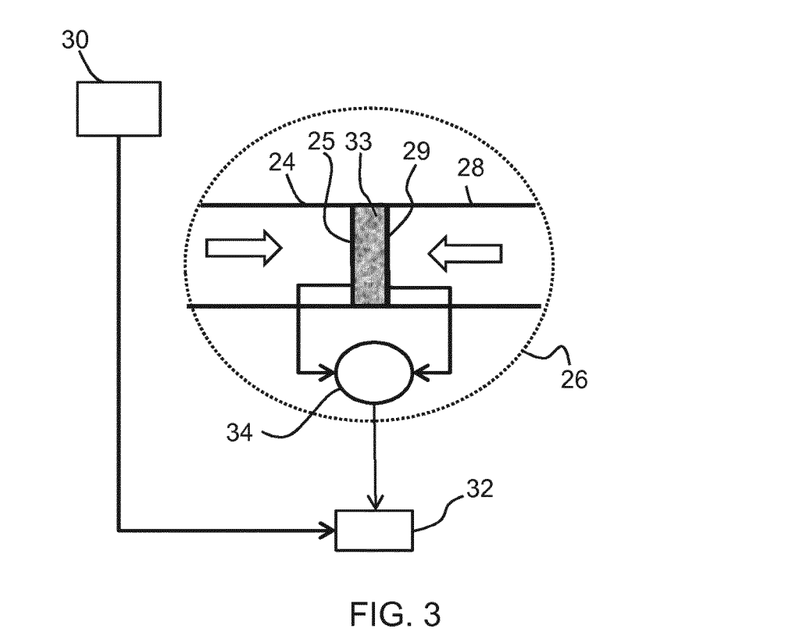
FIG. 3 shows a first example of sensor arrangement in more detail.

FIG. 3 shows a first example in more detail. It shows that the feed branch 24 leads to a first electrode 25 and the return branch 28 leads to a second electrode 29 with an electrolyte 33 between the electrodes. The voltage difference is output by a comparator 34.

As shown in FIG. 3, this example makes use of the additional sensor 30, such as a total volatile organic compound (TVOC) sensor. This is used to provide an initial pollutant concentration value.

The one-pass efficiency of the gas filter 22 can then be derived from the ratio of (i) the difference signal between the first electrode and the second electrode (i.e. a concentration difference based on the signal E) to the initial pollutant concentration value as measured by the sensor 30.

The sensor 26 has two electrodes 25, 29 separated by an electrolyte 33, and thus has a structure which functions in the same way as the known oxygen concentration cell sensor. The additional TVOC sensor 30 is used to check the upstream pollutant concentration.

Compared to a method based on the use of two TVOC sensors (one upstream and one downstream), the difference signal between the first and the second electrodes measured by the concentration sensor is more reliable since the two electrodes use the same electrolyte. If two sensors are instead used to measure the upstream and downstream concentration and their difference, the measured concentration and the difference are not reliable due to the sensor-to-sensor variation and sensor drift, which is limited by the current TVOC sensor technology.

For the same reason, the upstream concentration measurement using the sensor 30 is not expected to be highly accurate, and this means the derived one-pass efficiency suffers the same inaccuracy. However, the design does nevertheless enable the filter lifetime to be determined qualitatively. If the difference signal between the first and second electrodes of the concentration cell sensor is below a predefined threshold, a further check can be made as to whether the reading of the additional sensor 30 is below another predefined threshold. This may be done to rule out the situation that the air is very clean and hence causing the difference signal to be very small. If the difference signal is below the threshold, but the additional sensor 30 indicates that the pollutant concentration is high, then the filter can be judged to have reached the end of its lifetime.

Figure 4:
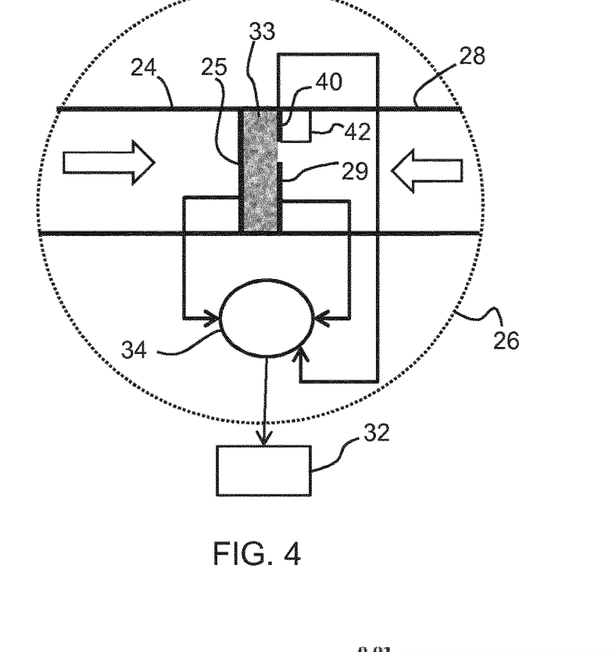
FIG. 4 shows a second example of sensor arrangement in more detail.

FIG. 4 shows a second example which does not need the upstream additional sensor 30.

The air before and after passing through the gas filer 22 is again channeled to the two electrode surfaces 25, 29 of the concentration cell sensor 26. In addition, there is a reference electrode 40 which is exposed to air in a sealed confined chamber 42. This is clean air, with a zero pollutant level, or a pollutant level close to zero.

The reference electrode 40 is located at the downstream side of the gas filter, but is insulated electrically from the second electrode 29 so that there are two electrodes on the downstream side of the concentration sensor. Thus, the electrolyte extends between the first (upstream) and second (downstream) electrodes but also between the first (upstream) and reference electrodes. In this way, a pollutant concentration difference between the two sides of the gas filter is derived from the difference signal between the first electrode and the second electrode, and the (absolute) pollutant concentration of the upstream air flow is derived from the difference signal between the first electrode and the reference electrode. Both concentration measurements make use of the same electrolyte 33 and the same electrode materials and thicknesses.

The one-pass efficiency of the gas filter represents the percentage of pollutants the filter can remove based on one pass through the filter. In this example, the one-pass efficiency is derived from the the ratio of (i) the difference signal between the first electrode 25 and the second electrode 29 to (ii) the difference signal between the first electrode 25 and the reference electrode 40.

The concentration cell sensor thus has three electrodes. Both of the difference signals (one between the first and second electrodes, and the other between the first and reference electrodes) as measured by the concentration sensor are reliable. Furthermore, the one-pass efficiency derived from these two delta signals is also reliable using the scalar value obtained by calculating the ratio between the difference signals. Thus, the concentration sensor in this case can detect the filter lifetime quantitatively and reliably.

Instead of using an additional sensor 30 or the three-electrode design to enable a calibration, the air purifier may include an interface to receive a user input about the initial air pollutant concentration level, or there may be a communications module to automatically obtain the initial air pollutant from an external data source such as the internet.

The clean air delivery rate of the air cleaner can also be derived by the processor based on the one-pass efficiency together with the airflow of the air cleaner. The filter lifetime can then be evaluated by analyzing the degradation of either the one-pass efficiency or the clean air delivery rate. For example, when the one-pass efficiency is below a threshold, the gas filter may be determined to have reached its end of life. Otherwise, the remaining usage time of the gas filter can be estimated by comparing the current one-pass efficiency with the threshold.

This filter lifetime detection method, based on checking the concentration difference of VOCs before and after passing through the gas filer, is equivalent to the clean air delivery rate (CADR) degradation check which typically carried out in a laboratory. Therefore, the method is reliable in nature, and it further provides an in-situ detection method for air purifier applications with one sensor in real time and at a low cost.

By way of example, a known zirconia-based solid electrolyte concentration cell sensor may be used for detecting several volatile organic compounds (VOCs; acetic acid, methylethylketone (MEK), ethanol, benzene, toluene, o- and p-xylene) at 1 ppm levels at 400° C.

Figure 5:
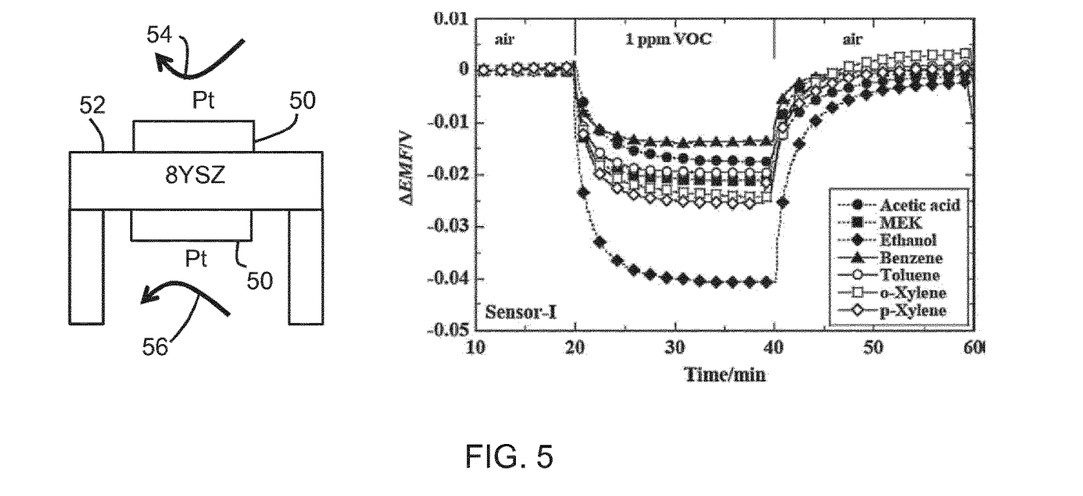
FIG. 5 shows a first known sensor design and its previously reported performance characteristics.

FIG. 5 shows the known sensor structure and the response behaviors.

The sensor has Pt electrodes 50 and an yttria-stabilized zirconia electrolyte 52, such as an 8YSZ electrolyte, which is 8 mol-% $Y_2O_3$ stabilized $ZrO_2$. The test gas flow is represented by arrow 54 and the reference gas flow is represented by arrow 56.

The difference voltage is shown in the graph in response to the introduction of 1 ppm of various different VOCs.

Figure 6:
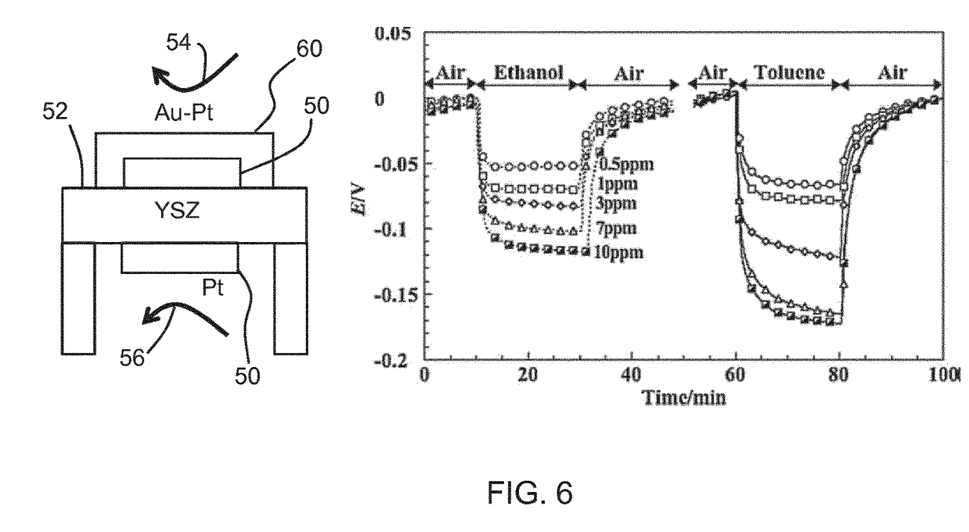
FIG. 6 shows a second known sensor design and its previously reported performance characteristics.

FIG. 6 shows an alternative known sensor structure and the response behaviors. The electrode facing the gas to be tested has an Au coating 60 for modifying the Pt electrode surface. The electrode potential difference is shown in dependence on the VOC concentration for two different target gases (ethanol and toluene).

For different concentrations, the signal varies linearly with the logarithm of the VOC concentration.

These are only examples of possible sensor materials. The sensor for various gaseous species can be designed by employing appropriate materials as the electrolyte and the electrodes. Many different materials with oxygen ionic or mixed ionic electronic conductivity are widely used in high-temperature electrochemical devices, such as solid oxide fuel cells (SOFCs), sensors, oxygen generators, electrochemical converters of natural gas and electrolyzers. These structures could potentially be used to form the concentration cell sensor.

Figure 7:
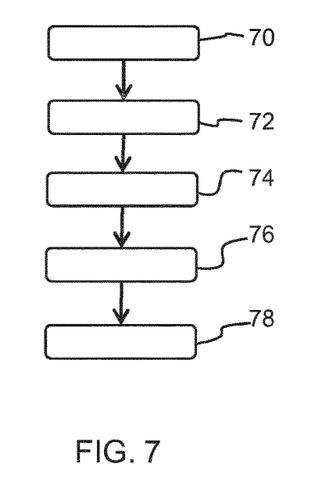
FIG. 7 shows an air purification method.

FIG. 7 shows the air filtering method for determining information relating to the condition of a gas filter.

In step 70, gas filtering is provided between an upstream air flow and a downstream air flow using a particular gas filter.

In step 72, a concentration difference of a target between the upstream side and the downstream side is measured using the concentration sensor comprising a first electrode and a second electrode, the first electrode being exposed to the upstream air flow and the second electrode exposed to the downstream air flow. The upstream air flow is unfiltered or ambient air. The downstream air flow is air filtered by the particular gas filter.

In step 74 a calibration is carried out. In the first example above, this calibration involves using an additional sensor exposed to the upstream air flow. In the second example above, the calibration involves a further concentration difference measurement between a reference electrode of the concentration sensor exposed to a confined gas volume and the upstream side.

In step 76 the concentration difference and the calibration measurement are processed to determine information relating to the condition of the gas filter.

The information may for example comprise advice that the gas filter has reached its end of life or the remaining usage time of the particular gas filter. This information is output to a user in step 78.

Calibration step 74 is not essential. Determining information relating to the condition of the gas filter may also be performed based on the concentration difference only. However, adding calibration step 74 provides a more accurate determination of the condition of the gas filter.

The gas filter may be determined to have reached its end of life if an output signal relating to the concentration difference between the upstream side and the downstream side is below a threshold. The information may additionally or alternatively comprise the one-pass efficiency of the gas filter and/or the clean air delivery rate of the air purifier.

The invention is of interest for air purifiers or air cleaners, other air sensing/purification systems, and new or fresh air delivery systems.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An air purifier, comprising:
 a gas filter located between an upstream air flow and a downstream air flow;
 a feed branch forming a first side channel from an inlet side of the main flow channel, the feed branch leading to a first side of the concentration sensor;
 a return branch forming a second side channel from an outlet side of the main flow channel leading to a second side of the concentration sensor;
 the first side channel and the second side channel being separated by the concentration sensor;
 the concentration sensor comprising a first electrode and a second electrode, the first electrode being exposed to the upstream air flow in the first side channel and the second electrode exposed to the downstream air flow in the second side channel,
 wherein the concentration sensor further comprises an electrolyte surrounded by the first and second electrodes to form an oxygen gas concentration cell, and wherein the concentration sensor is configured for providing an output signal based on the difference in concentrations of a target gas at the first and second electrodes; and
 a processor configured for processing the output signal to determine information relating to the condition of the gas filter.

2. The air purifier as claimed in claim 1, further comprising a calibration module configured for calibrating the concentration sensor based on an initial target gas concentration level.

3. The air purifier as claimed in claim 2, wherein the calibration module comprises:
 a reference electrode exposed to a confined calibration gas volume, wherein the reference electrode is arranged on a downstream side of the concentration sensor to enable a determination of a concentration difference between the upstream air flow and the calibration gas.

4. An air purifier as claimed in claim 2, wherein the calibration module comprises an additional sensor exposed to the upstream air flow.

5. An air purifier as claimed in claim 2, wherein the calibration module comprises a user interface for receiving the initial target gas concentration level from a user.

6. An air purifier as claimed in claim 2, wherein the calibration module comprises a communications module for receiving the initial target gas concentration level from an external data source.

7. The air purifier as claimed in claim 1, further comprising a calibration module.

8. The air purifier as claimed in claim 1, wherein the information comprises advice that the gas filter has reached its end of life or the remaining usage time of the gas filter.

9. The air purifier as claimed in claim 8, wherein the processor is adapted to determine that the gas filter has reached its end of life if an output signal relating to the concentration difference between the upstream side and the downstream side is below a threshold.

10. The air purifier as claimed in claim 1, wherein the information comprises the one-pass efficiency of the gas filter wherein the one-pass efficiency of the gas filter represents the percentage of pollutants the filter can remove based on one pass through the filter, derived from a ratio of the difference signal between the first electrode and the second electrode to the difference signal between the first electrode and a reference electrode.

11. The air purifier as claimed in claim 1, comprising a solid electrolyte which comprises zirconia, and the electrodes are platinum optionally with a gold coating.

12. The air purifier as claimed in claim 1, wherein the gas filter comprises activated carbon or other sorption materials.

13. The air purifier as claimed in claim 1, wherein the upstream air flow is coupled to a first side channel which communicates with the first electrode, and the downstream air flow is coupled to a second side channel which communicates with the second electrode.

14. The air purifier according to claim 1, wherein the upstream air flow is the air flow directed towards the gas filter for filtering, and wherein the downstream air flow is the air flow filtered by the gas filter and directed away from the gas filter.

15. The air purifier as claimed in claim 1, wherein the calibration module comprises a reference electrode exposed to a confined gas volume, and wherein the electrolyte of the reference electrode is located between the first and reference electrodes.

16. A method for determining information relating to the condition of a gas filter, comprising:

performing gas filtering between an upstream air flow and a downstream air flow in a main channel using a gas filter;

sensing a concentration difference of a target between the upstream side and the downstream side using a concentration sensor located in a side channel, the concentration sensor comprising a first electrode and a second electrode, the first electrode being exposed to the upstream air flow and the second electrode exposed to the downstream air flow, and wherein the concentration sensor comprises an electrolyte located between the first and second electrodes; and processing the concentration difference to determine information relating to the condition of the gas filter.

17. The method as claimed in claim 16, wherein the information comprises advice that the gas filter has reached its end of life, and/or the remaining usage time of the gas filter, and/or the one-pass efficiency of the gas filter and/or the clean air delivery rate of the air purifier.

18. The method as claimed in claim 16, comprising determining that the gas filter has reached its end of life if an output signal relating to the concentration difference between the upstream side and the downstream side is below a threshold.

19. The method as claimed in claim 16, comprising performing a calibration using a calibration module configured for calibrating the concentration sensor based on an initial target gas concentration level, which calibration module comprises an additional sensor exposed to the upstream air flow, or a reference electrode of the concentration sensor exposed to a confined gas volume, or a user interface for receiving the initial target gas concentration level from a user, or a communication module configured for receiving the initial target gas concentration level from an external data source.

20. An air purifier, comprising:

a gas filter located between an upstream air flow and a downstream air flow in a main flow channel;

a concentration sensor comprising a first electrode and a second electrode, the first electrode being exposed to the upstream air flow and the second electrode exposed to the downstream air flow, wherein the concentration sensor is arranged in a side channel coupled to the main channel at an inlet side and at an outlet side, wherein the concentration sensor comprises a solid electrolyte located between the first and second electrodes, and wherein the concentration sensor is configured for providing an output signal based on the difference in concentrations of a target gas at the first and second electrodes; and a processor configured for processing the output signal to determine information relating to the condition of the gas filter.

* * * * *